INVENTORS
WALTER HANSTEIN
MORTON W. MARCOVITZ
BY
Carl Fissell Jr
AGENT

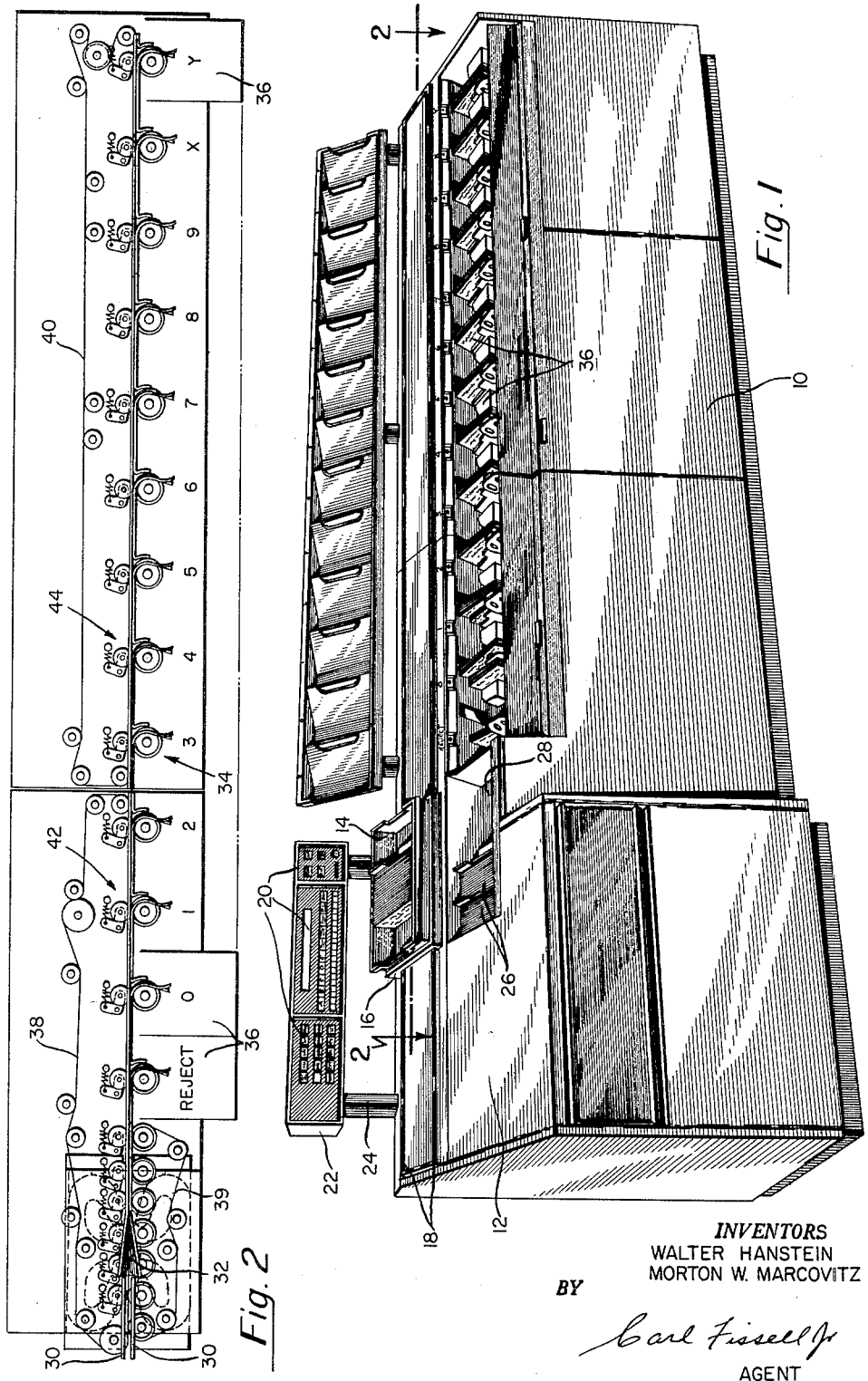

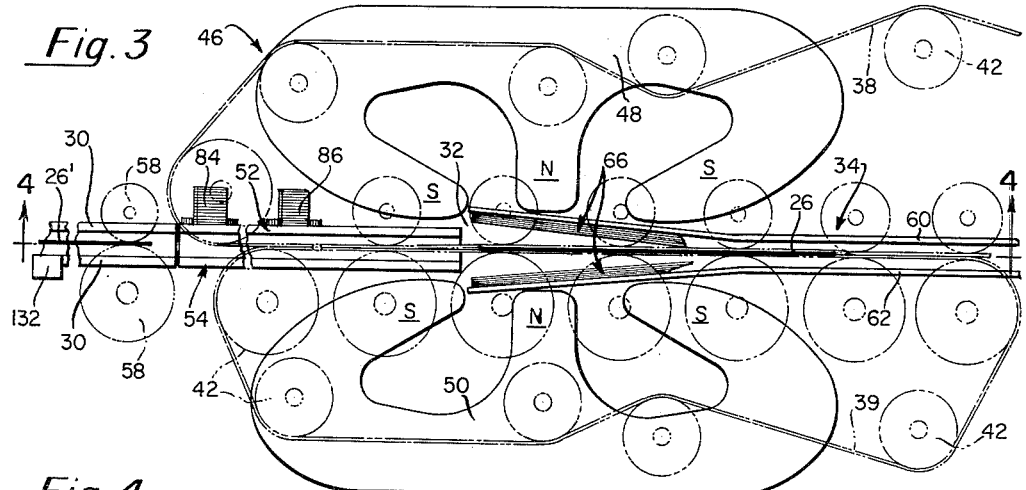
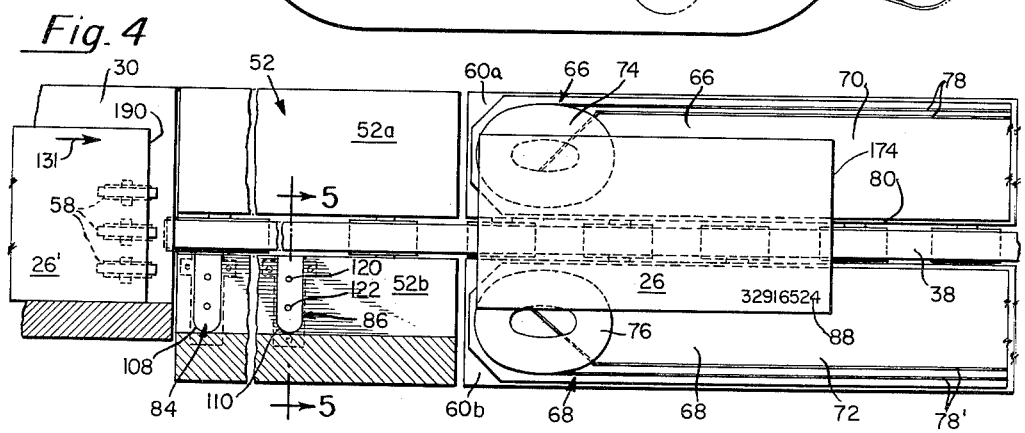
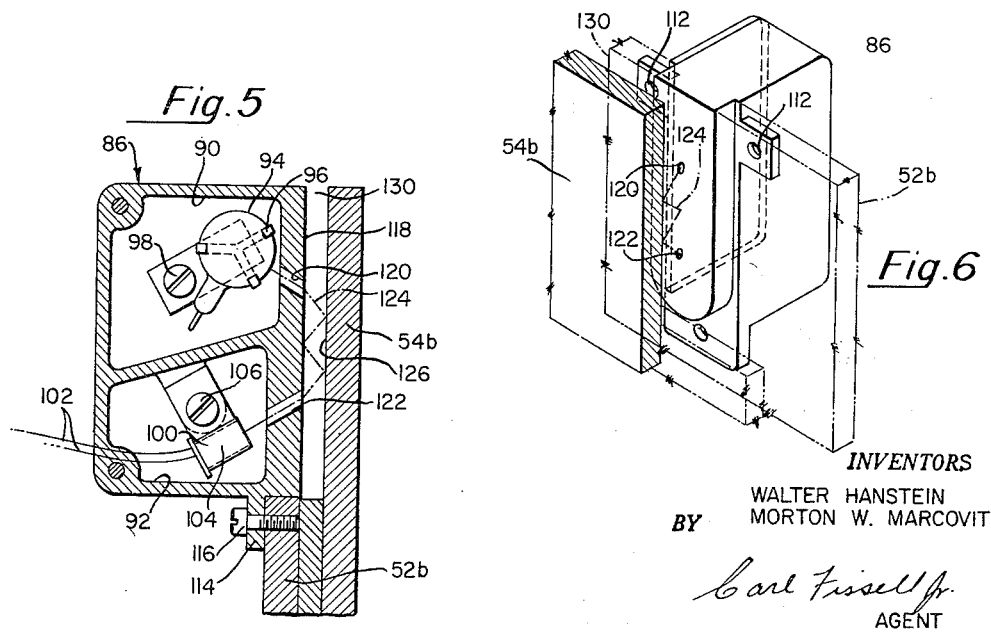

Sept. 4, 1962     M. W. MARCOVITZ ET AL     3,052,350
ITEM HANDLING APPARATUS
Original Filed Aug. 31, 1958     5 Sheets-Sheet 5

INVENTORS
WALTER HANSTEIN
MORTON W. MARCOVITZ
BY Carl Fissell Jr.
AGENT

United States Patent Office 3,052,350
Patented Sept. 4, 1962

3,052,350
ITEM HANDLING APPARATUS
Morton W. Marcovitz, Pasadena, Calif., and Walter Hanstein, Detroit, Mich., assignors to Burroughs Corporation, Detroit, Mich., a corporation of Michigan
Continuation of application Ser. No. 837,004, Aug. 31, 1958. This application May 31, 1961, Ser. No. 116,914
14 Claims. (Cl. 209—74)

This invention relates to high speed item handling apparatus, and more particularly, to automatic apparatus for timing and controlling a chute selection mechanism in sheet handling apparatus such as bank check sorters or the like. With still more particularity the invention has to do with controls for automatic chute selection apparatus, such as described and claimed in two copending applications, both assigned to the same assignee as the present invention and identified: "Magnetic Selection Apparatus," Serial No. 732,920, filed May 5, 1958, in the name of Walter Hanstein, and "Magnetic Selection Apparatus," Serial No. 771,851, filed November 4, 1958, in the name of Charles B. Hebeler. This application is a continuation of application Serial No. 837,004, filed August 31, 1958, now abandoned, in the names of Walter Hanstein, and Morton W. Marcovitz for "Item Handling Apparatus."

In such high speed sheet handling devices wherein magnetically responsive vane type chute blades lead to the sorter pockets, it is important to control the operation of the chute selection mechanism, in a manner preventing item jams at the chute entrance or from being missorted by entering the wrong chute.

In order that individual items, such as sheets, cards, checks, etc., may be accurately sorted into respective pockets or bins, the transport apparatus is designed to separate each item from its succeeding item by a predetermined distance or gap which is greater than the minimum distance required to provide sufficient time for the chute selection apparatus to operate, i.e., to select the desired chute on demand. However, in such sorter machines, conditions arise which necessitate action to prevent missorting or jamming of the items being processed.

It is an important object therefore of the present invention to provide apparatus for controlling such conditions in a relatively simple, easy and inexpensive fashion.

A further object of the present invention is to provide apparatus for controlling the chute selection apparatus in an automatic item sorter.

Another object of the present invention is to provide a novel electronic trigger mechanism for an automatic high speed item handling apparatus.

It is still another object of the present invention to provide automatic selection apparatus for use with item handling equipment which will accurately control the selection of a sorting chute for an item even under conditions wherein the spacing between items varies along the item transport pathway.

In accordance with the foregoing objects and first briefly described herein, the invention comprises a chute selection timing and control system including item detecting means for selectively actuating magnetic chute selection apparatus to select a chute for each incoming item in a manner preventing jams, missorts, pile ups and other erroneous sorting operations. In the drawings:

FIG. 1 is a perspective view of an item sorter incorporating the preferred embodiment of the present invention;

FIG. 2 is a somewhat diagrammatic top plan view along the line 2—2 of FIG. 1 illustrating the item transport apparatus with sorter cover removed;

FIG. 3 is a top plan view of a portion of the chute selector end of the item transport apparatus of FIG. 2 drawn to an enlarged scale and illustrating part of the chute selection means and certain of the photo-optical controls therefor;

FIG. 4 is a side elevational view taken along line 4—4 of FIG. 3;

FIG. 5 is an enlarged vertical sectional view taken along the line 5—5 of FIG. 4 illustrating one of the photo-optical units used with the present invention;

FIG. 6 is an isometric view of a photo-optical unit illustrated in position in the side wall of the apparatus of FIGS. 3 and 4;

Figure 7:
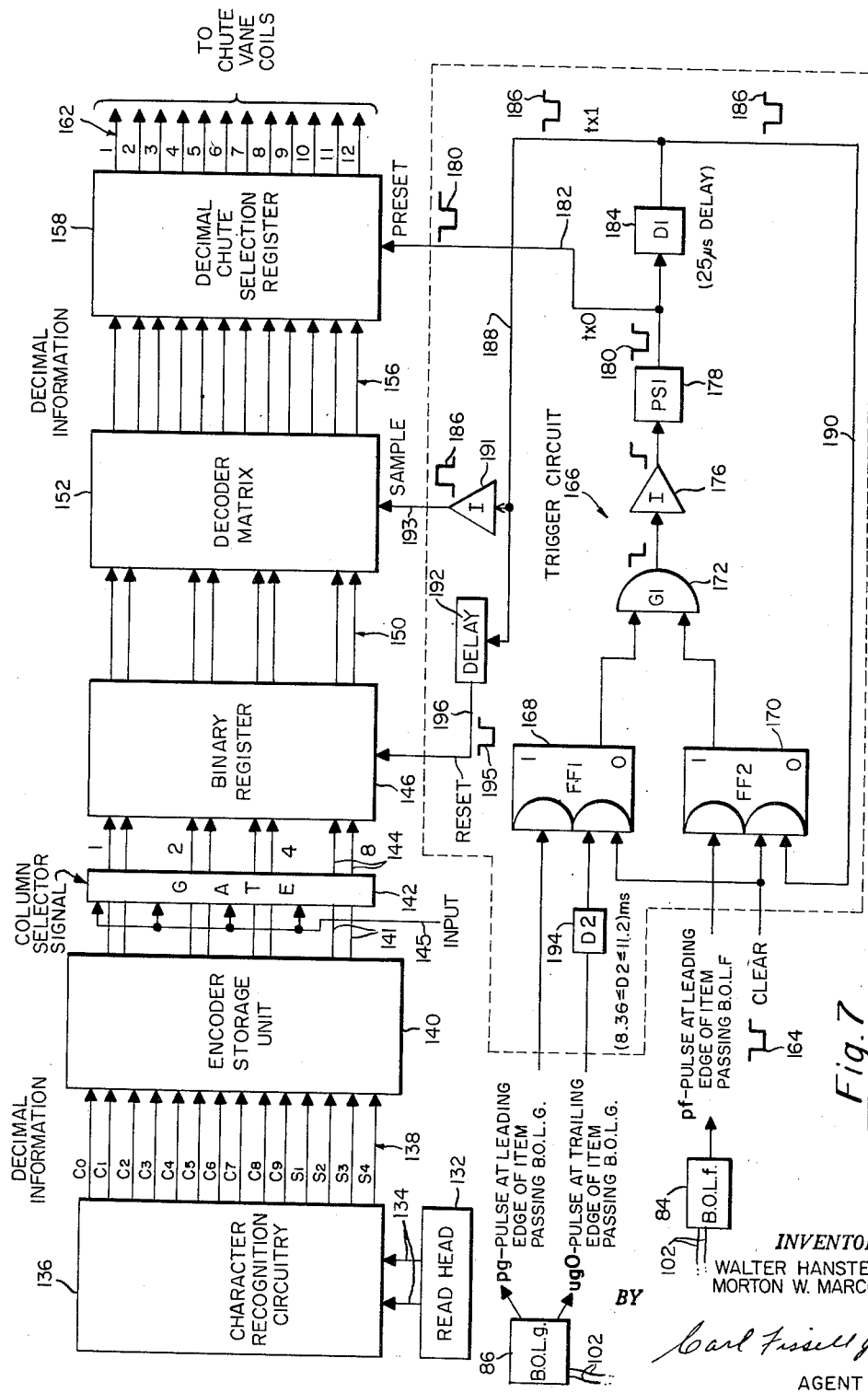
FIG. 7 is an idealized schematic diagram of the electrical utilization and trigger circuit for the present invention including means for interconnecting the photo-optical detection devices therewith.

In general, and as shown most clearly in FIG. 1, the preferred embodiment of the present invention is housed in a base cabinet 10 supporting a work surface 12 sloping upwardly from the front toward the rear thereof. The work surface supports an item receiving tray 14 removably associated with a carrier or cart 16 movable back and forth across the surface 12 on parallel tracks 18. Electrical controls 20 for the apparatus are housed in a rectangular panel box 22 supported in stand-off relation to the work surface 12, by members 24.

Items 26 to be processed, such for example, as checks, deposit slips, etc., are stacked in a loading hopper 28 from which they are fed by means, not shown, into an item guideway comprising members 30—30, only a portion of the guideway being illustrated in FIGS. 2 and 3.

The item guideway 30—30 terminates rightwardly adjacent the entrance 32 to a transport mechanism 34, FIGS. 2 and 3. Items are selectively fed at high speed through the transport mechanism 34 to item stacker pockets 36, in a manner set forth in the aforesaid patent application of Hanstein, Serial No. 732,920, by means of the belts 38, 39 and 40 and associated sets of rollers 42 and 44, the latter members being driven in a conventional manner by drive motors not shown. The transport apparatus just described is substantially identical to that described and claimed in a copending U.S. patent application entitled "Sheet Handling Apparatus," filed May 26, 1959, Serial No. 816,005 in the name of F. V. Palasciano, and assigned to the same assignee as the present invention.

Referring now to FIG. 3 it is seen that the sheet item chute selection apparatus 46 includes, among other things, an upper and a lower pair of tripolar magnetic members, only the upper pair including magnets 48 and 50 being shown herein. Each pair of magnets is disposed as shown, with their similar magnetic poles, south, north, south, in that order, in confronting parallel, spaced-apart relationship defining an air gap. Side wall forming members 52 and 54 as seen in FIG. 3 each including top and bottom members 52a and b and 54a and b respectively, see FIG. 4, form a continuation of the guideway formed by walls 30—30 and are disposed with respect to the upper and lower magnetic members so as to provide a continuing narrow, confined passageway or throat into which the items 26 are transported by means of rollers 58—58 from leading hopper 28 (FIG. 1). The rightward ends of the walls 52 and 54 (FIG. 3) extend for a short distance in between the leftward confronting magnetic poles identified S—S for south, south.

Positioned substantially within the air gap between the opposed center and rightward poles, north, north, south, south, respectively, of the magnets 48 and 50, and rightwardly of the guideway extension members 52 and 54 are located chute wall forming assemblies 60—62 each including upper and lower pairs of fixed members 60a—60b and 62a—62b respectively of the item transport apparatus 34, only the upper and lower members 60a and 60b being shown in FIG. 4.

Also disposed within the air gap between the two opposing sets of magnetic poles aforementioned are upper and lower sets of vanes or blades 66 and 68 respectively, FIG. 4. The leftward ends of the blades form the forward or entering portions of the item receiving chutes 70—72. The leftward vane ends are flexibly movable to one side or the other of the entrance 32 in the nature of flaps and in the manner set forth in the earlier mentioned Hanstein application.

The movable end of each upper and lower vane as viewed in FIG. 4, carries coils 74 and 76 respectively, which are capable of being energized, by means described later on, over conductive leads 78—78' also carried on the vanes, and extending rightwardly away from the coil along the surface of each vane, as shown. As is described and claimed in Hanstein, Serial No. 732,920 each vane coil sets up its own magentic field when current is applied thereto, from a source, not shown. The fields of the coils interact with the fields of the magnets between which the vanes are disposed, and thus each of the vanes is caused to be moved in one direction or the other by interaction of these magnetic fields. The chute wall forming members 60—62 are opened out or flared in the nature of a funnel to provide room for passage of the items when the vane ends become bunched together in one or the other sides of the passageway as shown in FIG. 3.

The provision of the clearance 80, FIG. 4 between the two vertically spaced groups of chute vanes is to enable the endless belts 38, 39 and 40 to project into the clearance and engage the documents 26 and feed them through the chute passage and on into the selected receiving pocket or bin 36, FIGS. 1 and 2. In FIG. 3, the two endless belts 38 and 39 are shown operatively associated with a number of feeding and idler rollers 42—42. The choice of multiple belts and rollers is a matter of design, due consideration being had for the relative space requirements of the machine.

In accordance with the present invention photo-optical light responsive position detecting and signalling apparatus is employed as a means for indicating to the chute control apparatus—described later—the position of the leading or trailing edge of each sheet during passage thereof through the guideway formed by walls 52 and 54 and that the selected chute was accepted and entrained an item sufficiently so that the chute selection and control bechanism can be made available to select a chute for the next incoming item.

In FIGS. 3–6, the photo-optical apparatus is seen to comprise two unitary self-contained assemblies 84 and 86 disposed in the lower side wall member 52b of the guideway of the sheet handling apparatus. Each of these assemblies, further identified herein as BOL–f and BOL–g in FIG. 7, respectively, is or may be substantially identical to the apparatus described and claimed in the copending application of James A. Ogle, entitled "Position Indicating Apparatus," Serial No. 792,293, filed February 10, 1959, and assigned to the same assignee as the present invention. The physical location of each assembly within the sorter apparatus is a matter of design choice dictated for the most part by the sizes of sheets being handled, the locations of various sheet feeding rollers, the magnets, and the space limitations thus produced. In the present embodiment the two beams of light detecting devices 84–86 are horizontally separated.

In a manner described in detail hereinafter, member 84, i.e., BOL–f, indicates generally to the chute control apparatus that the magnetic coded indicia 88, FIG. 4, on the item has been read and that a chute can now be selected, while member 86, i.e., BOL–g indicates, among other things, when an item is sufficiently within the chutes so that a new chute selection for the next item can be made.

Turning now to the physical structures themselves, as is shown clearly in FIGS. 5 and 6, each photo-optical assembly includes a compartmented structure having two substantially contiguous hollow chambers 90 and 92. Chamber 90 is provided with a miniature light bulb 94 which is adapted to be energized from a source of electrical current, not shown, but in a known manner. The bulb is supported within the chamber in any suitable fashion, as by means of a three-pronged clamp 96 secured on the chamber wall by means of a screw 98. Chamber 92 is adapted to receive and support a photo-senser or light sensitive element 100, e.g., a photo-cell of a type which also may be energized in a known manner, from a source, not shown. Output control signals may be derived from element 100 over leads 102, as will be described hereinafter. The light sensitive cell 100 is supported within the chamber by means of a sleeve 104 into which it is press-fitted and which is attached to the chamber wall by means of screw 106. Each of the photo-optical assemblies 84 and 86 is positioned within a respective aperture 108 and 110 (FIG. 4) formed in side wall member 52b. Locating holes 112 (FIG. 6) in projecting flanges 114 permit the members 84 and 86 to be removably secured in position, as by bolts 116.

As set forth in the earlier mentioned Ogle application, Serial No. 792,293, and as clearly shown in FIGS. 5 and 6, wall portion 118 of each assembly 84–86 is provided with a pair of apertures 120 and 122 separated from each other by a slight distance and opening into chambers 90 and 92, respectively. Aperture 120 is slanted at an angle with respect to wall 118, while aperture 122 is similarly slanted such that light beam 124 projects outwardly at an angle to the perpendicular while the reflected light is received by the photo-cell 100 at approximately the same angle from the perpendicular. The light beam is further angularly oriented with respect to the two apertures by using the side wall forming member 118 as one light reflective surface and the face 126 of side wall member 54b (FIG. 5) as the other reflecting surface, both surfaces having been previously polished to a mirror finish. FIGS. 5 and 6 illustrate that, the beam of light from bulb 90 is directed through upper aperture 120 in assembly 84 against surface 126 from which it is reflected to surface 118 then back to surface 126 and finally through aperture 122 to be picked up or sensed by the cell 100. In this fashion, the beam of light zig-zag across the narrow, confined passageway or slot 130 transverse to the horizontal direction of movement of the item. An item or sheet such as document 26 moving in the direction of the arrow 131, left side of FIG. 4, interrupts the light beam so that the position of the document is sensed or detected while it is in motion.

The two sheet position indicating assemblies 84 and 86 are located along the item pathway in the side wall members of the apparatus relative to a common area of each item such that the leading and/or trailing edge of any item entrained in the guideway 30—30 must cross the zig-zag light beam pattern produced by the assemblies. In this fashion, it is assured that the reflected light beam 124 will be interrupted by any item passing therethrough regardless of its size. By thus causing the light beam to describe a zig-zag path before striking the light sensitive member, the efficiency and accuracy of the apparatus is increased by substantially eliminating the possibility of a spurious signal output due to erroneously or inaccurately located punched holes, tears or other undesirable deformation of the document.

As shown in FIG. 4, and as set forth in the earlier mentioned Hanstein application, each item bears a series of indicia 88 on one surface thereof. In the present instance, these indicia are inscribed, imprinted or otherwise placed thereon through the medium of visible magnetic ink. Depending on the sorting code used, the items may be imprinted with Arabic numeric characters, 0 to 9, for example. When the apparatus is employed in bank bookkeeping or accounting, additional symbols indicating a hyphen, the amount, bank number, account number, etc., notations may be used. Obviously, the number of such characters and symbols may vary with the system employed. Although only fourteen unique characters are used with the present apparatus, the equipment is designed to be capable of handling 66 characters to an item. The apparatus contemplates the use of thirteen sorter pockets 36, i.e., Reject, 0 through 9, and X and Y, in that order (FIG. 2) the actual number of which is not related to these symbols but into which the items are or may be sorted.

Figure 8:
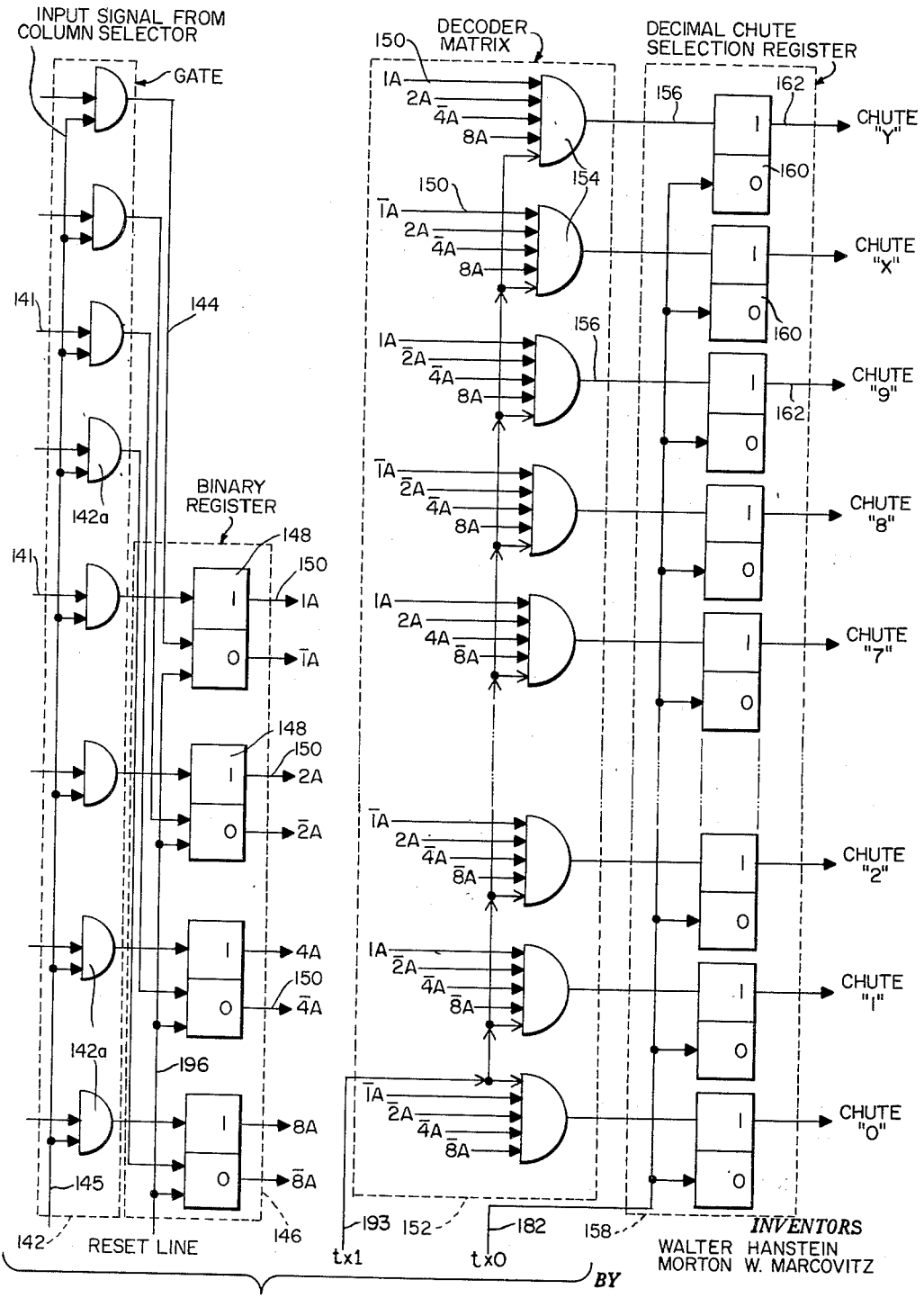
FIG. 8 is a schematic diagram illustrating certain portions of the electrical circuits shown in block form in FIG. 7.

Referring now particularly to FIGS. 3, 7 and 8, read head 132, which is or may be, substantially similar to the apparatus described and claimed in copending U.S. patent application, Serial No. 784,284, to H. M. Frederick for "Record Handling and Reading Apparatus," and assigned to the same assignee as the present invention, picks up or reads the character indicia from each item as the item moves past the head and the circuitry of the character recognition device 136 with which the head is associated produces an output signal having a characteristic waveform for each character. The information signal thus produced is selectively introduced over means such as conductive leads 138 (one for each character) into encoder storage unit 140 for temporary storage. One form of recognition device which could be employed in the present apparatus is described in a paper by Eldridge, Kamphoefner and Wendt, in the Proceedings of the Eastern Joint Computer Conference in New York, December 10–12, 1956, at pages 69 through 73.

In the fashion described and claimed in the copending application for patent of Virgilio Quioque, Serial No. 790,084 filed January 30, 1959, entitled "Encoder Circuit," and assigned to the same assignee as the present invention, the encoder circuitry converts this essentially decimal information as read from each item into 1–2–4–8 binary coded form. The present electrical equipment, that is, the equipment in the document sorting system in which the present invention is incorporated, is capable of storing a selected character from each of two successive items, such information being stored in the binary register 146 and decimal chute selection register 158, respectively, as will be described. For clarity and convenience throughout the remainder of this specification, the item involved will be referred to as a check for example, a bank check, but it is to be understood, of course, that the item could just as readily be some other type of document.

The information inscribed magnetically, or otherwise, on the check will ordinarily consist of a series of numbers or other characters. As each character is read from the check by read head 132 and identified in the character recognition apparatus 136, the information is introduced into encoder storage unit 140, the storage there being temporary since as information regarding each character is introduced into the encoder the information previously stored therein is destroyed.

Each character read from each check is passed into encoder unit 140, but the portion of the system to which the present invention is directed is only interested in a particular one of the series of successive characters on the check. For instance, if the checks are being sorted according to the clearing house number, that number may be physically located in the fifth position of the total numerical data imprinted on the check. Therefore, in order to read only the desired character (in the present example the fifth), as the characters of the total data are successively passed out of the encoder 140 via leads 141, the desired character is selected by a position or column selector, such selection being performed at the gate bank 142.

Referring to FIG. 8, as well as to FIG. 7, it is seen that gate bank 142 comprises eight individual and substantially identical "AND" gates 142a, each of which receives input signals from the encoder storage unit 140 over conductors 141, FIG. 7. A trigger signal in the form of an input control signal from column selector apparatus (not shown) is applied to the gate bank 142 via the lead 145 to trigger the particular gates which have been primed or conditioned by the received signals from encoder storage unit 140. The gated information is forwarded via conductors 144 to binary register 146 where the information is converted to binary form. The binary form is employed simply because in repetitive sampling operations it is more convenient to handle four bits of information than it is to handle the fourteen or more bits which are picked up from the check by the reading head and processed by the character recognition device 136. Also, the binary form of data is used elsewhere in the system for purposes not herein necessary to discuss.

Binary register 146, FIGS. 7 and 8, consists of four flip flops 148, the binary outputs of which correspond collectively to the original decimal number information read from the check, in, for example, the fifth column. The flip flops 148 are assigned individually weighted values according to the binary number arrangement, 1–2–4–8. These weighted values are shown in FIG. 8 at the output of each flip flop. Also shown at the outputs of the flip flops are the complement values for each of the flip flops. The complement value is illustrated with a dash mark above it and read with the prefix "not," for example, $\overline{8A}$ is read (not 8A). If, for example, the decimal digit read from the check by read head 132 in the fifth column is a 7, i.e., binary 1–1–1–0, then the output lines 1A, 2A, 4A, and $\overline{8A}$ (not 8A) of the binary register 146 would be "high," that is, would be at the higher or more positive of its two possible potentials. Throughout the remainder of this description, for convenience, an output lead from a flip flop will be said to be either "high" or "low" to indicate that the potential on that lead is the higher or lower of its two possible potentials. For example, referring particularly to the top flip flop of the four flip-flop binary register 146 shown in FIG. 8, the potential on lead 1A is high when the flip flop is in the "1" state and is lower when the flip flop is in the "0" state, the reverse being true of the potential on the lead $\overline{1A}$ (not 1A). Also, for convenience, an "AND" gate will be assumed to be open only when all of its input leads are "high," at which time the output lead of the "AND" gate will be assumed to go "low," i.e., go negative.

From the binary register 146, FIGS. 7 and 8, the information is forwarded over conductive leads 150 to a decoder matrix 152. In the embodiment of FIG. 8, decoder 152 includes a bank of "AND" gates 154, each gate being provided with five input leads four of which correspond to the 1–2–4–8 binary code, as before described. The remaining input lead to each "AND" gate is a common lead utilized for trigger sampling the gates.

Although the actual physical connections from the binary register 146 to the decoder matrix 152, are for simplicity, not shown in FIG. 8, the manner in which the interconnections are made between the two devices will be apparent. For example, output lead 1A from the top flip flop of binary register 146 is connected in parallel to each 1A input lead of the bank of "AND" gates 154 forming the decoder matrix 152. In similar manner, each of the other output leads of the four flip flops forming the binary register 146 are connected in parallel to the respective input leads of the bank of flip flops 154 bearing the corresponding designation. Thus, for example, if the binary register 146 held the decimal number 9, the binary code of which is 1-0-0-1, the top and bottom (first and fourth) flip flops of the four flip-flop binary register would be in the "1" state and the second and third flip flops would be in the "0" state. Hence, the output leads 1A, $\overline{2A}$ (not 2A), $\overline{4A}$ (not 4A), and 8A would be at high potential and the other four leads at low potential. Looking now at the input leads to the bank of "AND" gates 154 forming the decoder matrix 152 we see that of the entire number of "AND" gates shown (actually twelve but only eight being shown in FIG. 8) only the third "AND" gate from the top, corresponding to chute 9, will have all four of its binary input leads at high potential. Thus, when as later described, the decoder matrix is triggered by a positive pulse on the input lead which is common to all of the gates, only the third "AND" gate from the top will pass a pulse (negative) to set its corresponding flip flop in the chute selection register 158 to the "1" state, and only chute 9 will be actuated to open position. Actuation of the selected chute is accomplished by current flowing over that one of the output leads 162 which is associated with the flip flop selected by the open gate (the third gate from the top in the present example) and through the leads 78—78' (FIG. 4) of the coils on the ends of the chute blades of the selected chute (chute 9 in the present example). It will be understood that the twelve chute blades, in combination with the two side wall members of the transport apparatus lead to thirteen separate pockets or bins 36, earlier referred to, only three being shown in schematic form in FIG. 2.

The present apparatus has been designed to process checks (or other documents) having a maximum length of nine and one-half inches and a minimum length of five and three-quarter inches. The operating time of the chute selection apparatus is twenty-milliseconds, allowing for a minimum distance of eight inches between checks when the checks are travelling at the designed linear velocity of 400" per second.

In the system with which the present invention is concerned, the separation between checks (or other documents) is roughly proportional to the length of the successive checks. For example, if successive checks are six inches long, a space of approximately ten inches will exist between the two checks. However, the space between checks increases as the length of the preceding check increases. This is due to the fact that, for a reason not here pertinent, a check of longer length is not released as quickly as a shorter check into the high speed (400" per second) area of the system, the movement in a preceding portion of the system having been at a slower rate. In brief, while the distance between checks will be approximately constant so long as the length of the checks is approximately constant, the distance between checks will vary if the lengths of the checks vary. In the usual operation of the check sorting apparatus, not more than two checks will be in transport at one time in the area between the read head 132 and the chute entrance 32, FIG. 3.

The present invention is particularly directed to the provision of means for assuring that a chute (which has been opened to receive a check in response to a signal generated by such check) is not closed prematurely (that is, is not closed before the check has fully passed between the chute vanes into the selected chute) by virtue of a signal generated by a succeeding check following too closely upon the preceding check. This is accomplished by the use of two beam of light detectors BOL–f and BOL–g, reference numerals 84 and 86 respectively, located in the check transport path at different distances from the chute vanes. Detector BOL–f, reference numeral 84, is located farther from the chute vanes, and the spacing between the detectors is chosen having in mind the speed of movement of the checks and the time required for a chute to be opened and closed.

The inventive arrangement may be first briefly described by considering two checks in transport, one following the other. As the leading edge of the first check passes detector 84 a pulse is generated which opens the normally primed main gate of a trigger circuit and on the output side of such gate does several things. First, it clears the decimal chute selection register, which has been holding information regarding the chute selected by a preceding check. Next, after a short delay, the pulse is fed back to effect closing of the main gate just referred to. At approximately the same time, it triggers the decoder matrix 152, whereupon one of the decoder "AND" gates opens and as a result thereof a corresponding one of the chute vane coils is energized and a chute is selected. Lastly, after a further delay, the pulse (generated by detector 84) clears the binary register 146, which has been holding information corresponding to that which was also in the decoder matrix, now triggered.

Meanwhile, the first check has passed, or is passing, the beam of light detector 86 located closer to the chute vanes. When the leading edge of the first check passes detector 86, a pulse is generated which removes the primed condition from the trigger circuit main gate (through which signals must pass generated by the more remote detector 84) thereby effectively closing this gate to a succeeding signal. However, this condition does not persist long, for when the trailing edge of the first check passes the closer of the two detectors, i.e., detector 86, another pulse is generated which, after a short delay, is applied to again prime the trigger circuit main gate, thereby conditioning the gate to pass a signal received from the more remote detector 84 in response to the leading edge of the succeeding check passing thereby. In the event such a signal is received at the trigger circuit main gate before the trailing edge of the first or preceding check passes the closer detector 86, the signal merely waits there, and the instant the priming signal is received, such waiting signal is passed through to effect all of those things previously described, including activation of a selected chute.

It is to be understood that when a chute is selected, the information corresponding to that chute remains in the decimal chute selection register 158 until cleared out by a pulse derived from the leading edge of a succeeding check. Also, that the information regarding the chute to be selected for the succeeding check is in the binary register awaiting release, and that such release is effected by the pulse derived from the leading edge of a succeeding check. However, such pulse is delayed, where necessary, for a preselected interval of time after the trailing edge of the preceding check has passed the closer of the two detectors. In effect, the closer detector says: the trailing edge of the preceding check passed here ten (for example) milliseconds ago, so its all right to open the main trigger gate to let through any signal either waiting there or later arriving derived by the more remote detector in response to the leading edge of a succeeding check.

The circuitry briefly summarized above will now be described in detail. As previously indicated, it is assumed throughout this specification that "AND" gates are opened only when all of its input leads are "high" (e.g. positive) at which time the output lead is "low" (e.g. negative). When the gate is closed, as when at least one of its inputs is "low," the output is high. Although not previously set forth specifically, it is also assumed throughout the present specification that flip flops are triggered by negative-going or "low" signals, and, as hereinbefore indicated, the output lead from that side of the flip flop which in its present state is "high."

Referring now particularly to FIGS. 7 and 8, initially a negative clear pulse 164 is applied to flip flop FF1 (reference numeral 168) and also to flip flop FF2 (reference numeral 170) to place both flip flops in the "0" state. The "0" side of flip flop 168 and the "1" side of flip flop 170 are connected as separate inputs to the "AND" gate G1 (reference numeral 172). This gate functions as the main gate of the trigger circuit 166. With both flip flops 168 and 170 in the "0" states, as a result of the clear pulse 164, the main gate 172 is primed by virtue of its connection to the "0" side of flip flop 168, which is high, but is not open because of its connection to the "1" side of flip flop 170, which is low. When the leading edge 174, FIGS. 4 and 9, of the first check 26 interrupts the beam of light from the more remote detector 84, a pulse designated "*pf*" is generated which is applied to the "1" side of flip flop 170 and shifts it to the "1" state. As a result, both inputs to gate 172 are "high" and a negative-going voltage shift is generated which is inverted at inverter 176 into a positive-going voltage shift. This is applied to pulse standardizer PS1 (reference numeral 178), which may be a monostable multivibrator, and a 25 microsecond negative pulse is generated, identified as "*tx*0" chute selection pulse 180. As shown in FIGS. 7 and 8, the pulse 180 is applied over common conductor 182 to clear the decimal chute selection register 158 by shifting all of its flip flops to the "0" state. This causes selection of the reject pocket, FIG. 2. (The reject pocket is also selected if the information transferred through the decoder matrix 152 is inhibited for any reason.) The *tx*0 pulse 180 is also applied through delay device D1 (reference numeral 184) and the delayed pulse identified as "*tx*1" pulse 186, is applied over line 190 to flip flop 170 to reset flip flop 170 to the "0" state, thereby closing main gate 172. The pulse 186 is also applied over lead 188 through inverter 191 to the common conductor 193 and is thus applied in parallel as the fifth input to each of the five-input "AND" gates 154 of the decoder matrix 152. As a result all five inputs to but a single one of the gates 154 are "high," and that gate opens and delivers a negative pulse to its associated flip flop in the decimal chute selection register 158 to set such flip flop to the "1" state. The output lead from the switched flip flop is now "high" and current is driven through the coils of its associated chute vane to effect selection of that particular chute. Pulse 186 is also applied to the delay device 192, the output of which, designated pulse 195, is applied to lead 196 which is connected to the "0" side of each of the four flip flops forming the binary register 146. The application of the pulse 195 is thus effective to clear the binary register by setting each of its flip flops to the "0" state.

As the leading edge 174, FIG. 4, of the first check 26 passes the closer detector 86 a pulse designated "*pg*" is generated which is applied to the flip flop 168 to switch the flip flop from the "0" to the "1" state, thereby removing the primed condition from the already closed main gate 172. Both input leads to main gate 172 are now "low" or negative. However, when the trailing edge of the first check 26 passes the detector 86 a pulse is produced designated "*ug*0" which is applied through the delay device 194 (the delayed signal being designated "*ug*1") to the flip flop 168 to set the flip flop to the "0" state, thus priming main gate 172 and placing main gate 172 in condition to respond to the signal generated by the leading edge of the next check as it passes the more remote beam of light detector 84.

When the second check 26′ passed the read head 132, all of the information inscribed on the check was read, recognized in character recognition circuitry 136, applied to encoder storage unit 140 and converted into binary form therein, then applied to gate bank 142, selected by means of the column selector input pulse applied at the proper time, and then applied to the binary register 146 to set its four flip flops in those different states which together represent the stored binary information. At this time in the operation of the system, the first check 26 is not quite into its selected chute. Information, however, as to both items has been stored, information as to the first check being held in decimal chute selection register 158 and information as to the second check being held in binary register 146. As the leading edge 190 (FIG. 4) of the second check 26′ passes the more remote detector 84, a "*pf*" signal is generated which is applied to the flip flop 170 (FIG. 7) to set it in the "1" state. If, at this time, the main gate 172 is primed due to flip flop 168 being in the "0" state (and flip flop 168 will only be in the "0" state if the trailing edge of the preceding item had passed the closer beam of light detector 86 of the order of 8.3 to 11.2 milliseconds previously) the main gate 172 will deliver a negative-going signal to the trigger circuit 166 as previously described. If, at this time (i.e., at the time the "*pf*" signal is applied to flip flop 170), the main gate 172 is not primed, the input lead to the gate from flip flop 170 merely remains "high," and as soon as the flip flop 168 is switched to the "0" state in response to the "*ug*1" pulse, the other input lead to the main gate 172 goes "high" and the negative going signal is delivered from the output of the gate 172 to the trigger circuit 166, as previously described.

Figure 9:
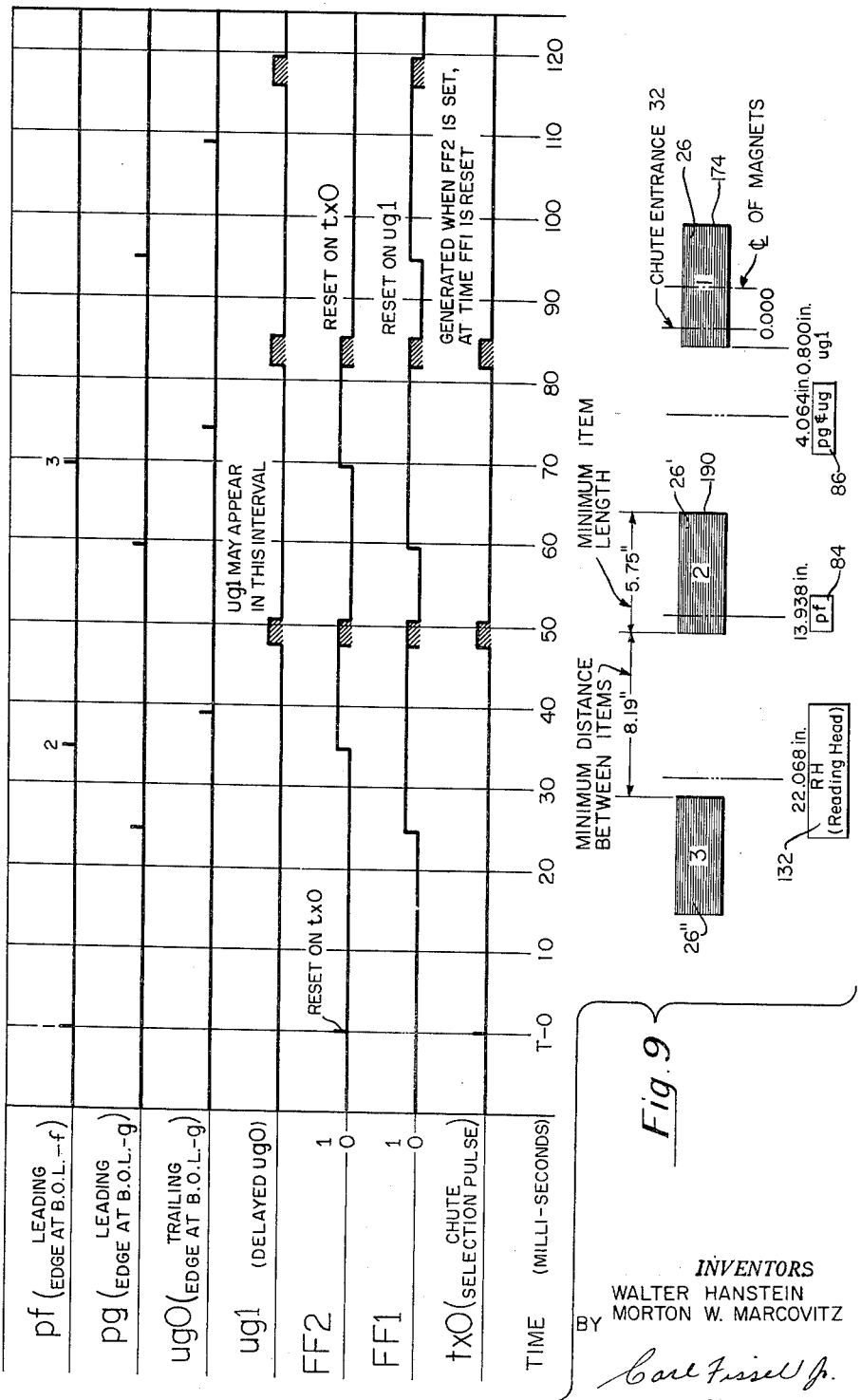
FIG. 9 is a timing diagram for use with the present apparatus.

In FIG. 9 there is graphically shown on a time (millisecond) basis, the flow of three successive checks through the system. A detailed discussion of FIG. 9 is probably not necessary in view of what has already been said, and only a brief discussion will be given.

When the leading edge of the first check passes the BOL–*f* detector at time 0, a "*pf*" signal is generated which sets FF2 to the "1" state, and since at this time flip flop FF1 is in the "0" state (as a result of a previous clear signal 164) the main gate 172 is opened and a *tx*0 signal is generated. After a very short delay, this *tx*0 signal is fed back to flip flop FF2 to reset FF2 to the "0" state. Although not shown in FIG. 9, it is to be understood from what has previously been said in connection with FIGS. 7 and 8 that each time a *tx*0 pulse is generated it is effective to also accomplish the following: First, clearing of the decimal chute selection register 158; then, triggering of decoder matrix 152 to apply the information waiting in binary register 146 to the decimal chute selection register to effect selection and opening of the newly selected chute; and lastly, clearing of binary register 146.

Returning now to FIG. 9, when, at time 25 milliseconds (ms.), the leading edge of the first check passes the nearer detector BOL–*g*, a "*pg*" pulse is generated which sets FF1 to the "1" state, but since FF2 is in the "0" state as a result of the previously generated *tx*0 pulse, no *tx*0 pulse is now generated. At time 35 ms., the leading edge of the second check arrives at the more remote detector BOL–*f* and a "*pf*" signal is generated which sets FF2 to the "1" state. However, FF1 is also in the "1" state as a result of the "*pg*" pulse generated by the leading edge of the first check when it passed the nearer detector BOL–*g*, the trailing edge of the first check not having yet passed the nearer detector. Thus no *tx*0 pulse is generated. At time 38 ms., the trailing edge of the first check passes the nearer detector BOL–*g* and a *ug*0 pulse is generated which is delayed in delay device 194 (FIG. 7) by from 8 to 11 milliseconds, the delayed pulse "*ug*1" being applied to FF1 to set FF1 to the "0" state. Since FF2 is in the "1" state, the main gate 172 is opened and a *tx*0 pulse is generated. (In FIG. 9, the arrival of the "*ug*1" pulse, the resulting setting of FF1 to the "0" state, the generation of the resulting *tx*0 pulse, and the resetting of FF2 to the "0" state are all shown to occur anywhere between times 47 ms., and 51 ms. (approximately). This is in recognition of the fact that the delay introduced by delay device 194 may vary between 8.36 and 11.2 milliseconds.)

At time 59 ms., the leading edge of the second check passes the nearer detector BOL–*g* and a "*pg*" signal is generated which shifts FF1 to the "1" state, FF2 then being in the "0" state. At time 69 ms., the leading edge of the third check passes the more remote detector BOL-*f* and a "*pf*" signal is generated which shifts FF2 to the "1" state. However, at this time FF1 is also in the "1" state so that the main gate 172 is closed and no *tx*0 pulse is generated. At time 74 milliseconds, the trailing edge of the second check passes the closer detector BOL-*g* and a "*ug*0" pulse is generated which is delayed in delay device 194 and a "*ug*1" pulse is applied to FF1 at between 82 and 85 milliseconds, the effect of which is to reset FF1 to the "0" state. Since at this time FF2 is in the "1" state, the main gate 172 is opened and a *tx*0 pulse is generated which after a very brief delay is fed back to reset FF2 to the "0" state. At time 95 ms., the leading edge of the third check passes the closer detector BOL-*g* and a "*pg*" signal is generated which is applied to FF1 to set FF1 to the "1" state. At time 108 ms., the trailing edge of the third check passes the closer detector BOL-*g* and a "*ug*0" pulse is generated which, after a delay of from 8 to 11 milliseconds, is applied to FF1 as a "*ug*1" pulse. This pulse sets FF1 to the "0" state at time 116–119 ms., thereupon priming main gate 172 for the arrival of the pulse which will be generated by the fourth check (not shown).

The lower portion of FIG. 9 shows some typical check lengths and separation distances in inches. In FIG. 9 the speed of movement is assumed to be 400″ per second, or 4 inches every ten milliseconds. It is to be understood, of course, that the speed, dimensions and times given in FIG. 9 are but illustrative and that other speeds, dimensions and times may be employed without departing from the spirit and scope of the present invention.

It should perhaps be mentioned that while "AND" gates of various types are well known and may be employed in the circuitry of the present invention, the preferred "AND" gate is a so-called resistance coupled transistor logic (RCTL) "AND" gate of the type shown and described in the copending application of Howard E. Tompkins, Serial No. 612,848, filed September 28, 1956, and assigned to the assignee of the present application.

It should also perhaps be mentioned that, for purposes of simplifying the description of the present invention, the switching of a flip flop in decimal chute selection register 158 to the "1" state was said to place a high potential on its output lead thereby to drive current through the coil of the chute vane associated with the particular chute being selected. In actual practice, it is preferable to utilize the arrangement described and claimed in copending application of Walter Hanstein, Serial No. 732,920, filed May 5, 1958, and assigned to the assignee of the present application. In such arrangement, the setting of a flip flop in the chute selection register energizes the coil not only on the vane of the selected chute but also energizes all of the vanes lying to one side thereof, such energization being in one polarity, all vanes lying on the other side of the selected chute vane being energized with current of the opposite polarity. This arrangement has the effect of both speeding up the movement of the vanes and also of effecting a more positive formation of a chute throat.

What is claimed is:

1. A system for synchronizing data transfer apparatus with item transport means including an item transport pathway comprising, a transducer, means to pass items bearing intelligible data in the form of recognizable indicia past said transducer to produce a signal output characteristic of said indicia, data storage means, means coupling said transducer to said data storage means, a source of control signals located in said pathway adapted to indicate the relative position of each item moving along said transport pathway, first electrical circuitry adapted to accept said control signals and to produce an output signal in response thereto, second electrical circuitry applying said output signal to said data storage means thereby to effect the transfer of data therefrom, and utilization means coupled to said data storage means, said utilization means including means responsive to said transferred data and movable in accordance therewith for selectively moving said items through said pathway.

2. A system for synchronizing the transfer of intelligible data on individual items with means including an item transport pathway for transporting said data bearing items comprising, means to pick up said data from each item, means to temporarily store said data, a source of control signals adapted to indicate the relative position of the leading and trailing edge portions of each item with respect to a predetermined point along said item transport pathway, electrical circuitry operatively associated with said source of control signals and adapted to accept said control signals and produce an output signal in response thereto, electrical circuitry coupling said output signal to said data storage means so as to effect a transfer of data therefrom, a chute selection mechanism including a plurality of item receiving members, and means coupling the output of data transferred from said data storage means to said chute selection mechanism whereby the item receiving members are automatically selectively conditioned to receive a selected item.

3. In a sheet handling apparatus for processing sheet items bearing intelligible information thereon, the combination comprising, an item transport pathway through which said sheet items are fed, means to feed said sheet items through said pathway, a plurality of chute forming vanes disposed in said pathway in side-by-side parallel relationship, one end of each of said vanes terminating in individual stacker pockets, the opposite ends of said vanes terminating together in a group, means for selectively moving said vanes to separate the same into two groups thereby opening an item receiving chute leading to one of said stacker pockets, means in said item pathway coupled to said vane separating means and responsive to the passage of said items therethrough for controlling the means for selecting a desired chute in response to the information content on said items, means disposed in said pathway and past which said items are moved to provide an output signal indicative of the passage of each item, and means for applying said output signal to said selecting means for controlling the selective movement of said vanes.

4. In a sheet item handling apparatus for processing sheet items bearing intelligible information thereon, the combination comprising, an item transport pathway through which said sheet items are fed, means to feed said sheet items through said pathway, a plurality of chute forming vanes disposed in said pathway in side-by-side parallel relationship, one end of each of said vanes terminating in individual stacker pockets, the opposite ends of said vanes terminating together in a group, means for selectively moving said vanes to separate the same into two groups thereby opening an item receiving chute leading to one of said stacker pockets, means in said item pathway coupled to said vane separating means and responsive to the passage of said items therethrough for controlling said means for selecting a desired chute in response to the information content on said items, a plurality of photo-optical devices disposed in spaced apart relation along said pathway and past which said items are moved thus to provide output signals indicative of the passage of each item, and means coupling said output signals to said selecting means for controlling the selective movement of said vanes.

5. In a sheet item handling apparatus wherein sheet items having intelligible information thereon in the form of decimal indicia are sorted at high speed, the combination comprising, an item guideway, an item transport mechanism for moving said items through said guideway, a plurality of chute forming vanes disposed in said guideway in side-by-side parallel relationship, means to move said vanes sidewise with respect to one another to separate one portion of said vanes from another portion thereof thereby to open a chute to receive an item therein, means in said guideway to sense said intelligible information from said items and produce a signal output corresponding thereto for application to said vane moving means thereby to select a chute corresponding to the decimal indicia sensed from said items, and photo-optical means in said guideway responsive to the passage of said items for producing a signal output indicative of the passage of an item, said photo-optical means including means for applying its signal output to said vane moving means to thereby time the selective movement of said vanes.

6. In a sheet item handling apparatus for processing sheet items bearing intelligible information thereon, the combination comprising, an item transport pathway through which sheet items are fed, means to feed said sheet items through said pathway, a plurality of chute forming vanes disposed in said pathway in side-by-side parallel relationship, one end of each of said vanes terminating in an individual stacker pocket, the opposite ends of said vanes terminating together in a group, electromagnetic means for separatingly moving said vanes thereby opening an item receiving chute leading to one of said stacker pockets, an electromagnetic read head in said item pathway having its output coupled to said vane moving means and responsive to the passage of said items past said head for selecting a desired chute corresponding to the intelligible information on said items, and a pair of photo-optical devices disposed in said pathway past which said items are obliged to move, either one or both of said photo-optical devices being effective to control the operation of said vane moving means and including means coupling the outputs from said photo-optical devices to said vane moving means thereby to control the time when the selection of a desired chute is made.

7. In a sheet handling apparatus for sorting sheet items of varying sizes and bearing intelligible information thereon, each of said items bearing different indicia having a characteristic waveform when magnetized, said apparatus comprising, an item guideway having input and output ends, means for moving said items sequentially through said guideway from the input to the output end thereof in predetermined spaced relation determined in part by the length of the items, a plurality of chute forming vanes forming continuations of said guideway, one end of the vanes terminating together in a transversely aligned group at the output end of the guideway, the opposite end of each vane terminating in an individual item stacker pocket, magnetic means forming opposing magnetic fields across said aligned vane ends, electromagnetic means on each of said aligned vane ends cooperating when energized with said magnetic fields across said aligned vane ends to move said aligned vane ends selectively to open a chute to receive an item from said guideway, means adjacent said guideway for reading said intelligible information thus to produce a waveform signal characteristic of said indicia, means for storing said signal, means including a trigger circuit and connecting said storing means with each of said electromagnetic means on said aligned vane ends, and means adjacent said guideway and responsive to the leading edge of an item to actuate said trigger circuit whereby said waveform signal is effective to energize said electromagnetic means to cause certain of said aligned vane ends to move in a direction effective to open the chute corresponding to said waveform signal.

8. A construction according to claim 7 and further including means responsive to a trailing edge of an item and cooperating with said leading edge responsive means to actuate said trigger circuit whereby said signal is effective to energize said electromagnetic means when the spacing between said items is more than a predetermined minimum distance.

9. Sheet item handling apparatus for items bearing magnetizable characters thereon in decimal form comprising, a guideway through which said items are moved, means for feeding said items one at a time into said guideway, an electromagnetic reading head for sensing said decimal characters and producing a characteristic waveform output for each said character as each item passes said head, a plurality of chute forming vanes disposed in side-by-side parallel relationship and each terminating at one end in a separate stacker pocket, the opposite ends of said vanes terminating together at a single location in substantial edge alignment, a pair of permanent magnets disposed adjacent said guideway with their like pole faces in confronting alignment forming an air gap therebetween, said magnets establishing a first plurality of magnetic fields the lines of force of which enter into the air gap, said opposite aligned ends of said vanes projecting into said air gap for a substantial distance, electrical current carrying means on each of said aligned vane ends for establishing a second plurality of magnetic fields lying at right angles to said first plurality of magnetic fields, character recognition means responsive to said characteristic waveform output, a binary encoder storage unit to which said waveform output is fed, gating means, a binary register responsive to said gating means, a decoder for translating said binary information into decimal form, chute selection means having a plurality of outputs corresponding in number to the number of the chutes formed by the vanes, means operatively connecting the decoder to the chute selection means and rendering the latter responsive to the translated decimal output of the former to open the corresponding chute between the vanes and a trigger circuit for said apparatus, said trigger circuit including means for generating a clearing and a normalizing signal for application to said chute selection means, and means in said guideway responsive to the movement of said items through said guideway for actuating said trigger circuit thereby enabling said chute selection means to energize said current carrying means on said aligned vane ends whereby the interaction between said first and second plurality of magnetic fields causes said vane ends to open a selected chute leading to a stacker pocket.

10. Sheet item handling apparatus for processing items bearing intelligible information thereon, comprising means forming an item guideway through which said items are transported, means for feeding said items into and through said guideway, transducer means responsive to the passage of the magnetizable material thereby for generating an output signal indicative of the information content of said material, said transducer means being positioned adjacent the guideway for reading the magnetizable material on the items fed through the guideway, a plurality of item detection means disposed at intervals along said guideway, each of said detection means being responsive to the movement of said items thereby to produce a signal output characteristic of the relative position of portions of said items with respect to each said detection means, a plurality of chute forming vanes disposed in side-by-side parallel relationship, each vane terminating at one end in an item receiving pocket, a plurality of magnetic field generating members disposed adjacent said guideway with their like poles in confronting face to face arrangement and defining a narrow air gap therebetween, the opposite ends of said vanes terminating in edge alignment within said air gap, each of said last mentioned vane ends having means for applying an electrical current thereto for establishing an electromagnetic field of a desired polarity therethrough, recognition-storage means to which said transducer output signals are applied, chute selection means coupled to said recognition-storage means providing an individual signal output current corresponding to the stored information read from each item, and trigger circuit means electrically coupled to said item detection means for controlling said chute selection means thereby to cause said chute selection means to apply said signal current to said means on said vane ends whereby the magnetic fields of said vanes interact with the magnetic fields produced by said magnetic members thus to move said vanes in a direction to open a chute leading to an item pocket.

11. Sheet item handling apparatus for processing items bearing intelligible information thereon comprising, means forming an item guideway through which said items are transported, means for feeding said items into and through said guideway, transducer means in said guideway responsive to the passage of the magnetizable material thereby for generating an output signal indicative of the information content of said material, said transducer means being positioned adjacent to the guideway for reading the magnetizable material on the items fed through the guideway, a plurality of item position detection means disposed at intervals along said guideway, each of said detection means being responsive to the movement of said items thereby to produce a signal output characteristic of the relative position of portions of said items with respect to each said detection means, a plurality of groups of chute forming vanes disposed in side-by-side parallel relationship, the vanes of each group terminating at one end in an item receiving pocket, a plurality of magnetic field producing members disposed adjacent said guideway with their like poles in confronting face to face arrangement and defining a narrow air gap therebetween, the magnetic lines of force from said magnetic members projecting into said air gap, the opposite ends of the vanes of each group terminating within said air gap, each of said opposite vane ends having means for establishing a magnetic field therethrough the lines of force of which react with the lines of force of said magnetic members, means to which said transducer output signals are applied for recognizing and storing the information from each item, chute selection means responsive to said recognition means for providing individual output signals corresponding to the stored information read from each item, and trigger circuit means in circuit with said detection means for controlling said chute selection means thereby to cause said chute selection means to magnetically energize said means on said vane ends whereby due to the interaction of the lines of force of the two magnetic fields said vanes are moved to open a chute to receive an individual item.

12. Automatic control mechanism for an item handling apparatus comprising means disposed in parallel spaced apart relationship forming a passageway for the movement therethrough of sheet items, means for transporting sheet items successively through said passageway, a first photo-optical control device positioned in said passageway, said first device being energizable to produce an electrical output signal in response to movement of the leading edge of an item thereby, a second photo-optical device positioned in said passageway and being spaced apart from said first device, said second device being energizable to produce an electrical output signal in response to movement of the leading and the trailing edge of said item thereby, means to recognize intelligible indicia on said item and to produce a signal corresponding thereto, first storage means to which said signal is applied, second storage means to which said signal is adapted to be electrically transferred from said first storage means, a plurality of chute forming members disposed in said passageway, electrical current carrying means on one end of each chute forming member, means connecting said current carrying means on said chute forming members to said second storage means, a chute selection register having output connections to said current carrying means on said members and responsive to the energization of said first and second photo-optical devices to apply a chute selection signal to said current carrying means on said members thus selectively to separate a part of said chute forming members from the other members thereby to open an item receiving passageway therebetween.

13. Sheet handling apparatus for processing sheet items bearing intelligible information thereon, the combination comprising, an item transport pathway through which sheet items are fed, means to feed said sheet items through said pathway, a plurality of chute forming vanes disposed in said pathway in side-by-side parallel stacked relationship, one end of each of said vanes terminating in individual stacker pockets, the opposite ends of said vanes terminating together in a group in substantially edge alignment, said vanes being movable sidewise in the nature of flaps, the magnetic fields of which intersect the edge aligned ends of the vanes, a plurality of magnets in said item pathway, electromagnetic means carried by each of said edge aligned ends of the vanes for separatingly moving said vanes within the fields of said magnets, chute selection means coupled to said means on said aligned vane ends for moving the same sidewise to open a desired chute, an electromagnetic read head in said item pathway having its output coupled to said chute selection means and being responsive to the movement of said items past said head for producing an electrical output signal corresponding to the information on each of said items, and a pair of spaced-apart similar optical members disposed in said guideway, each of said optical members producing an electrical output signal in response to movement of items therepast, both said output signals being coupled to said chute selection means and timing the opening of the chute corresponding to the information sensed from the item.

14. In a sheet handling apparatus for processing sheet items bearing intelligible information thereon, the combination comprising, a plurality of vane members terminating at one end in item receiving chutes, electrically energizable means on said vanes, an electromagnetic transducer, means for moving said items past said transducer whereby said transducer is adapted to read information from said items, character recognition apparatus including means for producing a characteristic waveform output for the information read from said items by said transducer, an encoder storage unit having a decimal numeric input and a binary coded output, a binary register having an input and an output, a control gate for said binary register for gating the output from said encoder storage unit to the input of said register, a decoder matrix having a binary input and a decimal output, means connecting said binary register output to said decoder matrix input, a decimal chute selecting register, means coupling the output of said decoder matrix to said chute selecting register, the output of said decimal register being electrically connected to said means on said vanes, and a trigger control circuit for said apparatus, said trigger circuit including a pair of flip flops each having an electrically low and a high output, a first sheet item edge detection member, a second sheet item edge detection member, said detection members being located in the path of movement of said items, and generating a signal output in response to the movement of said item therepast, coincidence circuit means coupling the outputs of said pair of flip flops and passing a signal only when said flip flops are electrically high, delay means through which said output signal is fed to said decoder matrix for sampling said matrix and setting said chute selecting register to thereafter cause said register to select a desired chute, and means coupling the output directly from said flip flops to said chute selection register for energizing said means on said vanes for opening the chute in response to the sampling of said decoder matrix.

No references cited.